Aug. 8, 1933.  E. D. GOODWIN  1,921,918
COLOR PHOTOGRAPHIC SYSTEM
Filed July 15, 1929   2 Sheets-Sheet 1
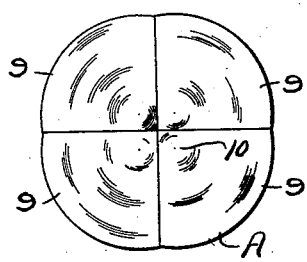
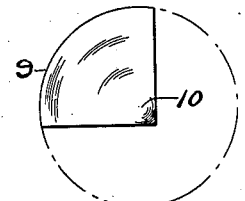
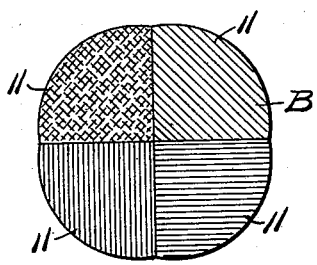
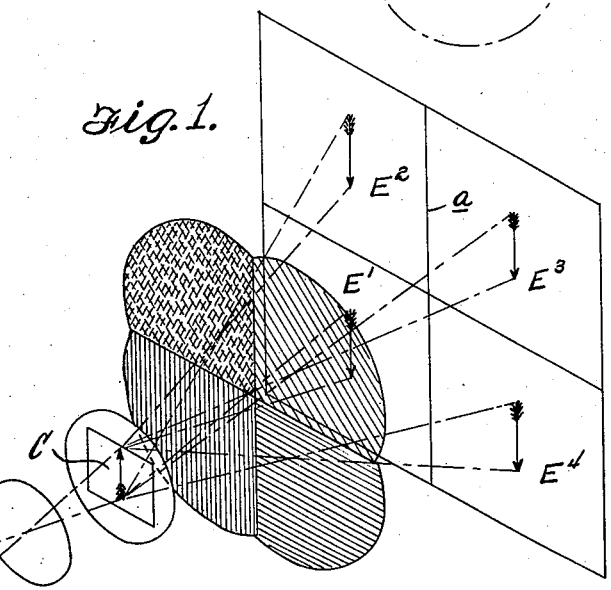
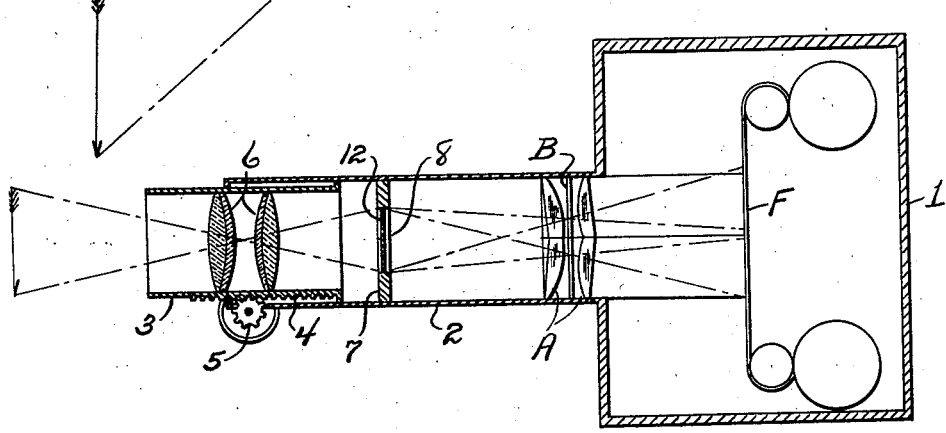
Ellis Donald Goodwin INVENTOR
BY Victor J. Evans
ATTORNEY Aug. 8, 1933.  E. D. GOODWIN  1,921,918

COLOR PHOTOGRAPHIC SYSTEM

Filed July 15, 1929  2 Sheets-Sheet 2

Ellis Donald Goodwin
INVENTOR

BY Victor J. Evans
ATTORNEY

Patented Aug. 8, 1933

1,921,918

UNITED STATES PATENT OFFICE 1,921,918

COLOR PHOTOGRAPHIC SYSTEM

Ellis Donald Goodwin, Sioux City, Iowa

Application July 15, 1929. Serial No. 378,407

1 Claim. (Cl. 88—1)

This invention relates to a color photographic system, the general object of the invention being to provide means for photographing objects in such a manner that when the images are projected through a similar device, pictures in natural colors will be produced, the invention comprising an optical arrangement which records the images of the component colors contained within the object in black and white, on panchromatic film, and when projected through a similar device, produces pictures in natural colors on a screen.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a diagrammatic view showing the operation of the invention.

Figure 2 is a sectional diagrammatic view showing the arrangement of the camera parts.

Figure 3 is a face view of the combination lens.

Figure 4 is a view showing how each section of the combination lens is formed.

Figure 5 is a view of the combination filter.

Figure 6:
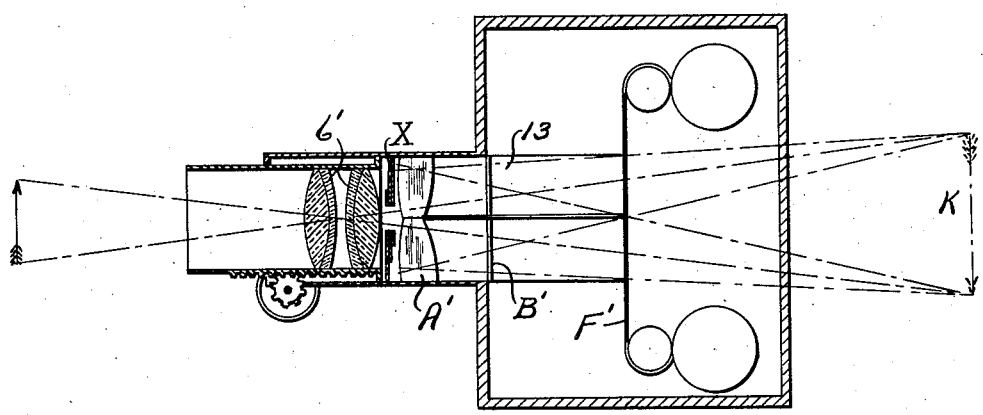
Figure 6 is a view similar to Figure 2, but showing a different arrangement of parts.
Figure 7:
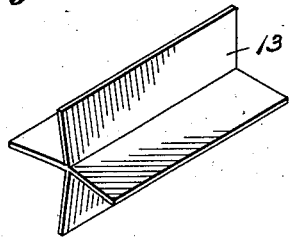
Figure 7 is a view of the member used in Figure 6 for forming a boundary between the four images on the film.

Referring particularly to Figure 2, the numeral 1 indicates the camera, 2 the lens barrel and 3 the objective lens barrel which is slidably arranged in the barrel 2 and is adjusted therein through means of the rack 4 and pinion 5. Of course, any desired means may be substituted for the rack and pinion for adjusting the barrel 3 in the barrel 2 to secure the proper focus. The objective lens is shown at 6 and is preferably formed of two sections spaced apart in the barrel 3. A member 7 is placed in the barrel 2 adjacent its front end and this member has an aperture 8 therein, and adjacent the rear end of the barrel 2 is placed the combination lens A also formed of two sections spaced apart and between the sections is placed the combination filter B.

The combination lens A has each section composed of four segments 9, each segment being formed from a complete lens, as shown in Figure 4, the lens being ground in such a manner that the optical center 10 of the segment is located adjacent the inner corner of the segment, as shown in Figures 3 and 4. The segments are then cemented together with an opaque substance, and as will be seen from Figure 3, the complete member, composed of the four segments, has four optical centers arranged adjacent the center of the member.

The combination filter B is also composed of four segments 11, these segments being respectively colored red, yellow, green and blue.

The object to be photographed is brought to a focus on the plane of the aperture 8 in the member 7, by means of adjusting the barrel 3 in the barrel 2 so as to adjust the lens 6 to the proper position to form the aerial image C at the aperture. The four optical centers of the combination lens A brings the aerial image to a focus on the film F in the form of four complete pictures of the object being photographed. Each picture conforms to the shape of the aperture 8 and the optical centers are so spaced that the four pictures are divided, as shown at $a$ in Figure 1. The segmental filters record in each quarter of the film only the image of the part of the object as transmitted by said filter. For example, when the aerial image C is brought to a focus on the film at $E^4$ by a blue segment of the lens A and the rays pass through the violet filter, only the violet of the object is recorded. If a green object with red polka dots is being photographed, the image of the green object is recorded at $E^3$, with blank spots for the polka dots, while on the section $E^1$ of the film, the polka dots are recorded through the red filter. This completes the photographing process. The film is then developed and a positive obtained, either by printing the negative or using the reversing process. The positive is placed in the same position in a projector as the film was placed in the camera and the positive in black and white is projected by means of a white light through a similar optical arrangement in the projector as that used in the camera.

Continuing the illustration before mentioned, the portion $E^3$ of the film containing the image of the green of the object, will be projected through the green filter which is associated with one of the segments of the combination lens and this filter will blot out all but the greens of the white light and the image comes to a focus at aperture 8 and forms that part of the aerial image which is green, and this aerial image is projected onto the screen by means of an objective lens. If the other three portions of the film were made opaque, the projected image would only contain the greens of the object, but since the positive image of the red is also projected in like manner, the red polka dots fall in their respective positions on the screen. Thus the object resumes its natural color.

To illustrate further: When an object having all colors is photographed through such an optical system, the image is recorded in black and white, but when projected through a similar optical system (containing complementary filters), it again takes on color and is brought to a focus by means of the combination lens, with the optical centers at aperture 8 forming the aerial image C, which in turn is brought to a focus by the objective lens on the screen forming the natural color picture.

The number of lens segments of combination lens A, with a like number of complementary filters, may be altered, but four is found to be a good number since the entire rectangle of the film can thus be used. Of course, the filters selected must contain the primary colors in such proportions that if a blank film is projected through the optical system, the result will be a white screen. Due to the fact that some light wave lengths affect a photographic plate more than others, different intensities of color filters are used in photographing than in projecting.

For microscopic objects or closeups, or in fact, when any object of considerable depth of field is to be photographed, it has been found necessary, in order to completely eliminate parallax, to place a ground glass 12, or substitute, in aperture 8, so that the image formed by the objective lens 6 will conform to an absolute plane, which in turn is focussed by the individual lens segments of combination lens A to form four identical images with respect to form on the film. In projection, of course, the ground glass is not used, since the four images on the film are identical and all lie in one plane.

The reason that the image at aperture 8, as picked up by the four lens segments of combination lens A, conforms to an absolute plane, is because of the fact that a ground glass or substitute has been placed in aperture 8. The illumination from the object focussed by means of objective lens 6, illuminates the ground particles on the glass and since no image formation can be formed behind the ground surface, due to the ground surface intercepting, and no image formed in front of the ground glass could be picked up by the combination lens segments, since the ground surface would intercept that. Only the image actually falling on the ground surface would be brought to a focus on the film by means of combination lens A segments and, therefore, the depth of field in the image at aperture 8 would be eliminated.

The image on the ground glass 12 at aperture 8 is composed of illuminated ground particles, in color, which are brought to a focus through the lens segments of combination lens A on the film, much as a film or slide is projected to a screen through an objective lens.

The above described optical device can be used equally well for standard or sub-standard motion pictures, stereopticon slides or home portrait taking and viewing devices. Reduction prints may be made from standard movie film so as to be used in home machines.

The advantages set forth in the above described device are as follows:—

The objective lens 6 is necessary to bring the object to a focus at aperture 8, for if the lens segments of the combination lens were used to bring the object to a focus directly on the film without using the objective lens 6 to form aerial image C, then on projection, we would meet with two difficulties. First, the lens segments would not record identical images, due to the stereoscopic effect of the optical centers not being identical. On projection, there would be color bands on the screen. Second, the projected picture would always have to be exactly life size or the same distance from the projector as when photographed, otherwise, a little nearer or farther would cause the different image segments to not superimpose on the screen, since a camera sees in only one direction and the optical centers would be at different angles from the object being photographed.

The objective lens 6 should be corrected for both spherical and chromatic aberration, for if not corrected for chromatic aberration, the component colors in the aerial image of the object would not fall on the plane of the aperture 8 and when focussed on the film by the combination lens and when projected, will form colored overlapping bands around the edge.

The combination lens is of simple construction since it only passes light of a definite wave length and, therefore, does not need to be corrected for chromatic aberration. The only correction necessary is for spherical aberration. The combination lens is constructed by grinding four complete lenses of the desired focal lengths and then grinding away from the sides of each so that the four segments fit together with their optical centers in their respective positions so as to bring the aerial image to a focus on the respective quarters of the films. The lens segments are then cemented together.

The filters may be placed immediately in front of the combination lens A instead of between the sections thereof, or anywhere between the combination lens and film.

In the modification shown in Figure 6, a long focal length objective lens 6' is used which would form an image at K and the combination lens A' with its filters are placed close to the rear of the objective lens. This arrangement will form four images on the film F' which is, of course, located considerably in advance of the point where the aerial image K would be formed. This arrangement makes is possible to obtain considerably more light than in the first form of the invention. A member 13 of opaque material and composed of two planes perpendicular to each other and both parallel to the optical axis of the objective lens, is placed between the combination lens and the film, as shown in Figure 6. This member forms a boundary between the four images on the film.

In the modification shown in Figure 6, the combination lens may be constructed from the usual circular lens by grinding the circular lens to a square, quartering the square in such a way that each quadrant is itself a square, then assembling these four segments so that the optical centers lie in each corner of the square. This method of construction of combination lens forms relative-size images on the film and coincident images on projection. An iris diaphragm X with its center on optical axis of the objective lens is placed immediately in front of combination lens, with means for regulating the amount of light falling on individual segments of combination lens.

A similar arrangement is used in projecting; the distance from combination lens and the film in photographing being constant, but in projecting, this distance may be altered to compensate for the shrinkage of the celluloid base of the film.

As shown in Figure 6, the location of the optical centers of the four segments of combination lens A' is accomplished by drawing lines from the base of the large aerial image K to the base of the small image on the film and extending through the lens segments, and by drawing lines from the vertex of the large aerial image to the vertex of the small image and extending through the lens segments. The place where these lines cross is the optical center of the combination lens segment, because the rays passing directly through the optical center of a lens suffer no refraction at the optical center.

A universal focus objective lens may be used in place of the focussing type of objective lens, when a universal focus camera is desired.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A photographic system comprising a device including a casing, a barrel with an iris diaphragm, a second barrel adjustably connected with the first barrel, an objective lens in the second barrel, a combination lens in the first barrel formed with positive lens segments having their optical centers lying considerably outside the optical center of the iris diaphragm, whereby the extreme edges of the lens segments act as curved prisms diverting the image formed by the objective lens into multiple images in a single plane, a combination filter associated with the combination lens and composed of a plurality of filters of different colors, each filter being associated with an optical center, whereby a plurality of images in the same plane with each other of the component colors contained within the object being photographed will be produced on the sensitized medium in black and white, and an opaque member consisting of two planes arranged at right angles to each other located between the sensitized medium and the combination lens.

ELLIS DONALD GOODWIN.